R. M. BECKER.
COMBINED TYPE WRITING AND COMPUTING MACHINE.
APPLICATION FILED JULY 31, 1913.

1,296,354.

Patented Mar. 4, 1919.

WITNESSES:
Julius Dickstine
L. Fittiger.

INVENTOR:
Richard M Becker
BY
D. C. Stickney
ATTORNEY

R. M. BECKER.
COMBINED TYPE WRITING AND COMPUTING MACHINE.
APPLICATION FILED JULY 31, 1913.

1,296,354.

Patented Mar. 4, 1919.
7 SHEETS—SHEET 2.

WITNESSES:
Julius Duckstine
L. Fittiger

INVENTOR:
Richard M. Becker
BY
B. C. Stickney
ATTORNEY

R. M. BECKER.
COMBINED TYPE WRITING AND COMPUTING MACHINE.
APPLICATION FILED JULY 31, 1913.
1,296,354.
Patented Mar. 4, 1919.
7 SHEETS—SHEET 3.
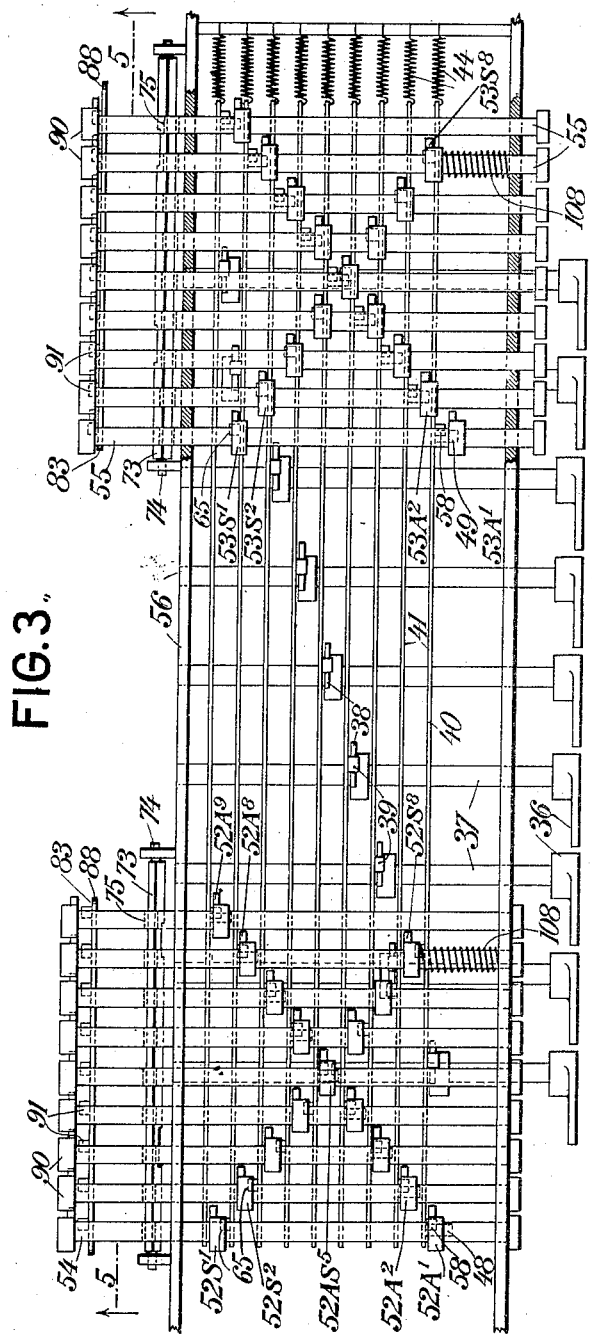
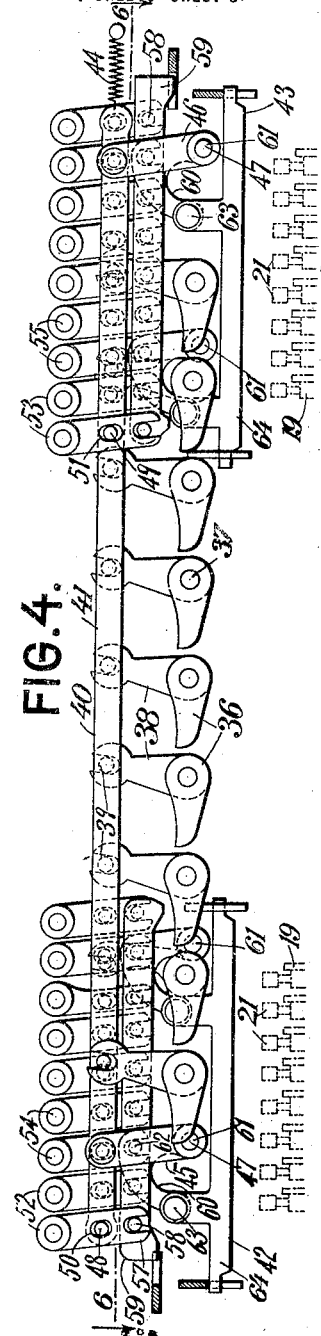

R. M. BECKER.
COMBINED TYPE WRITING AND COMPUTING MACHINE.
APPLICATION FILED JULY 31, 1913.

1,296,354.

Patented Mar. 4, 1919.
7 SHEETS—SHEET 4.

WITNESSES:
Julius Duchstine
L. Bittiger.

INVENTOR:
Richard M Becker
BY
DC Stickney
ATTORNEY

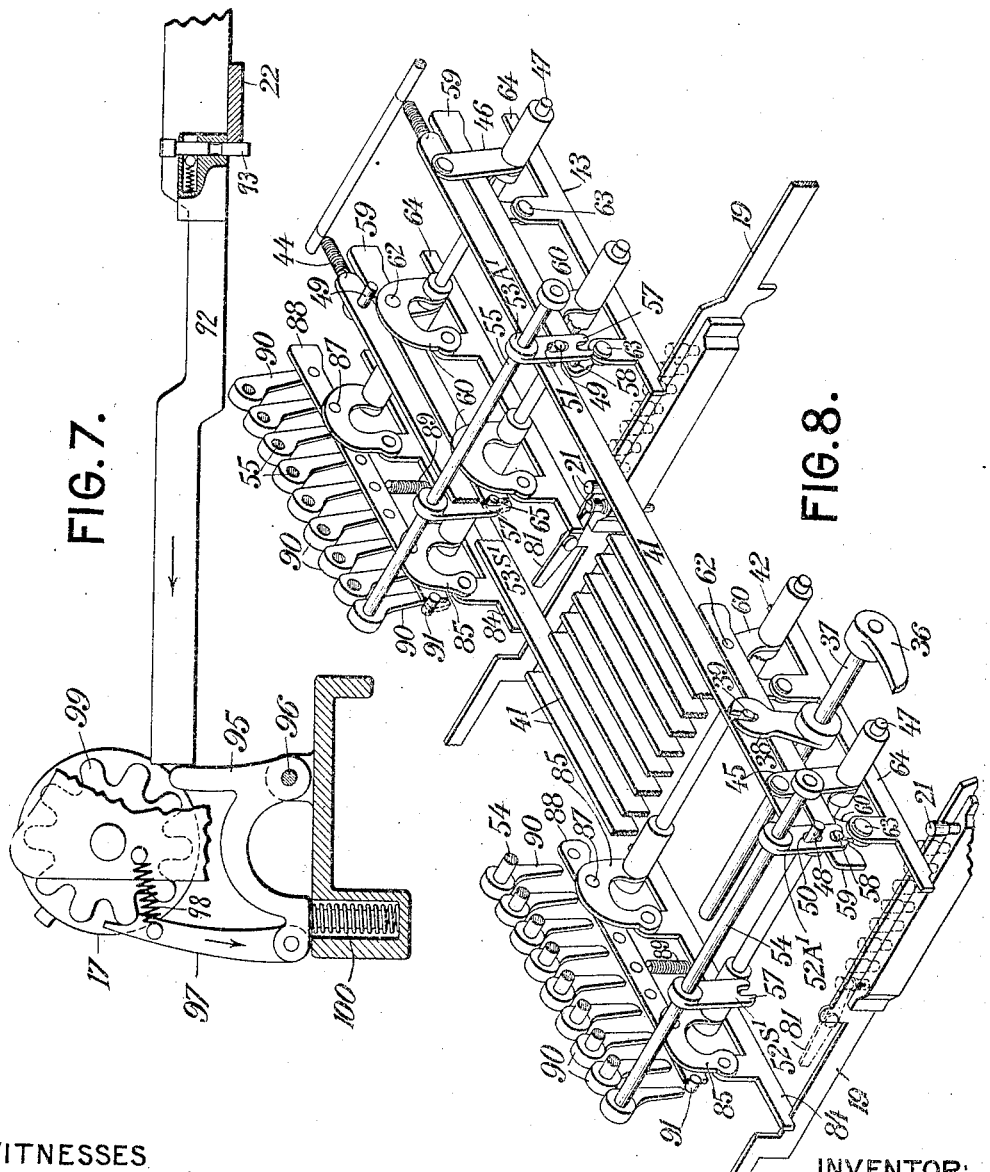

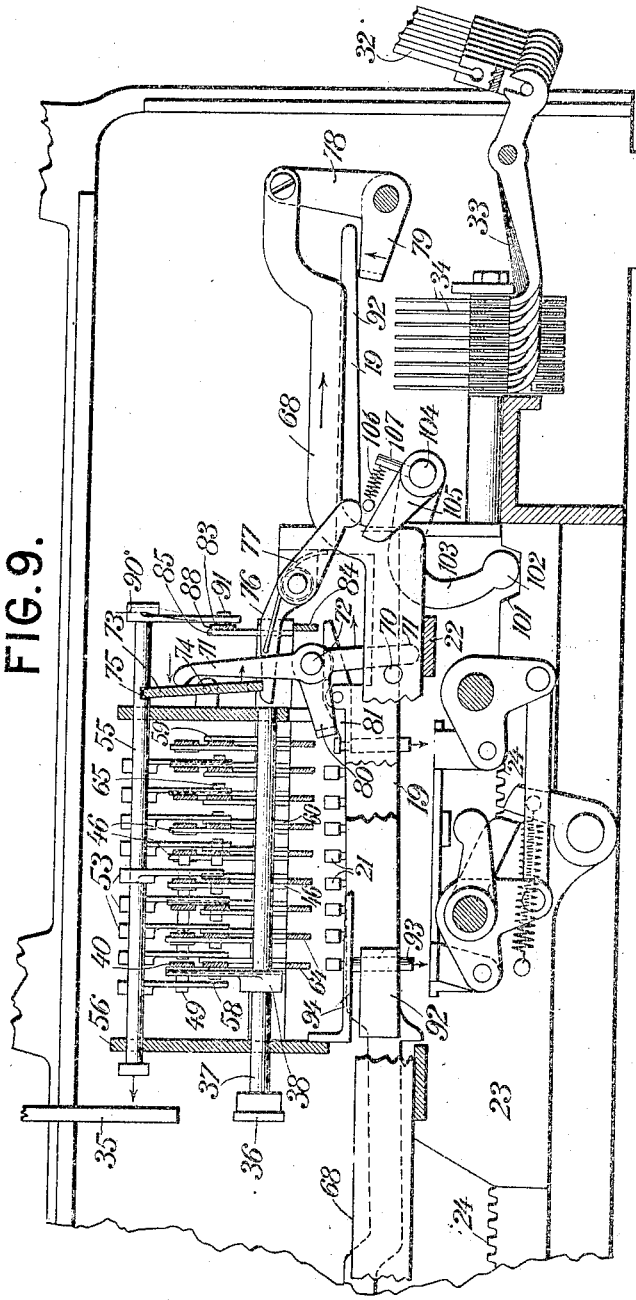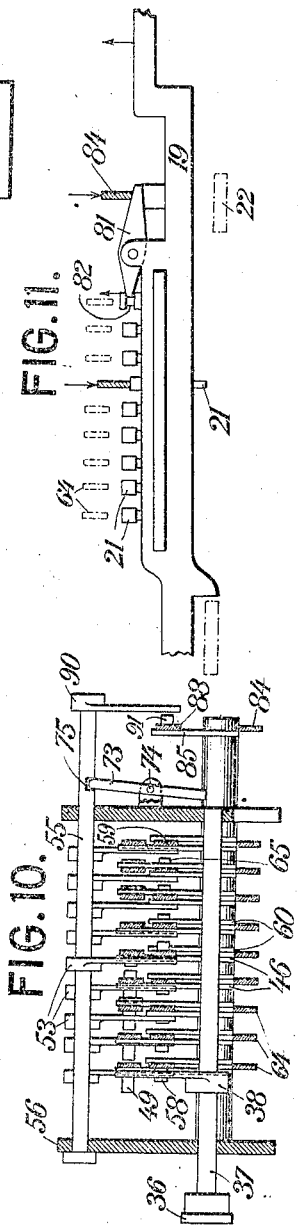

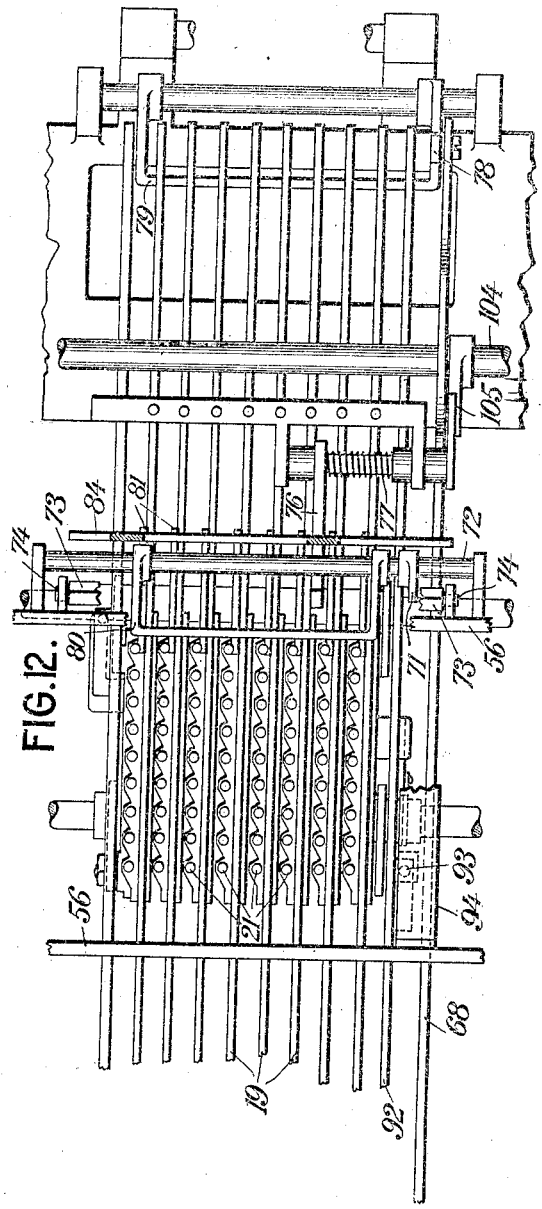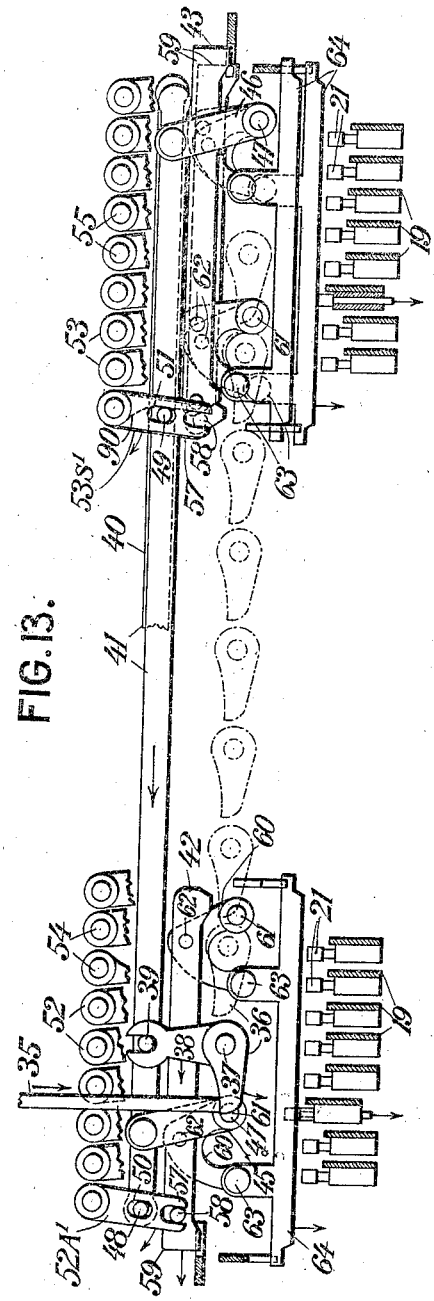

UNITED STATES PATENT OFFICE.

RICHARD M. BECKER, OF BROOKLYN, NEW YORK, ASSIGNOR, BY MESNE ASSIGNMENTS, TO UNDERWOOD COMPUTING MACHINE COMPANY, OF NEW YORK, N. Y., A CORPORATION OF NEW YORK.

COMBINED TYPE-WRITING AND COMPUTING MACHINE.

1,296,354.  Specification of Letters Patent.  Patented Mar. 4, 1919.

Application filed July 31, 1913. Serial No. 782,307.

*To all whom it may concern:*

Be it known that I, RICHARD M. BECKER, a citizen of the United States, residing in Brooklyn borough, city of New York, in the county of Kings and State of New York, have invented certain new and useful Improvements in Combined Type-Writing and Computing Machines, of which the following is a specification.

This invention relates to an improvement in combined typewriting and computing machines of the Underwood-Hanson type especially and is an improvement on an application of Hans Hanson, No. 626,550, filed May 11, 1911.

In the above-mentioned application it has been shown how subtraction may be performed in a computing mechanism of the indexing type by the complementary method. That is to say, it has been shown how pin-bearing rack-bars had their pins set corresponding to the values of the numeral keys, so as to rotate computing wheels connected thereto corresponding amounts for addition, and for subtraction the pins instead of being set according to the direct values of the keys actuated were set according to the complements of the values of the keys actuated, using nine as the whole number or base in obtaining the complement in the decimal system. This was shown for but one computing head.

In the present invention it is shown how subtraction can be carried on by this complementary method not only for one computing head but for a plurality of computing heads, and it is also shown how one computing head may be adding while another is subtracting, all under the control of the same set of numeral keys. To accomplish this a plurality of computing heads are provided, and in the instance used to illustrate the invention two are shown. Each of these heads is provided with a set of rack bars, which form denominational column members and are each provided with a series of nine pins corresponding to numeral keys from "1" to "9". The numeral keys are arranged not only to typewrite the numbers to be computed but also to actuate a set of linkages, which may be called primary or master linkages in that they are common to all of the numeral keys and to all of the computing heads. Each computing head, however, has an individual set of pin-setting linkages which may be actuated by the master linkages at the actuation of the numeral keys and may be termed secondary linkages. These secondary linkages set the pins for their own particular computing head to correspond either directly with the values of the numeral keys actuated or according to the complements of the values of the numeral keys according to whether the particular computing head to which they belong is set for addition or for subtraction. Each computing head has an individual state-controlling or subtraction-setting mechanism so that the one may be set for subtraction while the other is set for addition, and both computing heads will concomitantly carry out their own particular computation with the same set of numbers.

Other features and advantages will hereinafter appear.

In the accompanying drawings—

Figure 1 is a vertical section taken from front to rear of the machine with parts broken away to show the underlying structure and with parts omitted for the sake of simplicity.

Fig. 3 is an enlarged top plan view of the pin-setting mechanisms for both computing heads showing, however, contrary to Fig. 2, the left-hand pin-setting mechanism in an adding condition and the right-hand pin-setting mechanism in a subtracting condition.

Fig. 4 is a detail in elevation of the pin-setting mechanisms shown in Fig. 3.

Fig. 7 is a detail view in elevation partly broken away to show the underlying structure of the supernumerary bar and mechanism for giving an added step of movement to the computing wheel of lowest denomination, that is, the units or cents computing wheel.

Fig. 8 is a skeleton perspective view of the pin-setting mechanisms showing the left-hand set in an adding condition and the right-hand set in a subtracting condition.

Fig. 9 is an enlarged vertical section taken from front to rear showing the pin-setting mechanisms and the "9" pins for one of the computing heads in the act of being set for subtraction.

Fig. 10 is a vertical section similar to the section of the pin-setting linkage shown in Fig. 9 but showing the same set for addition.

Fig. 11 is a detail section from front to rear of the machine, showing the setting of the "6" pin in the setting up of a number according to a subtracting computation with the concomitant unsetting of the "9" pin.

Fig. 12 is a detail top plan view showing one of the nest of pin-bearing rack bars.

Figure 2:
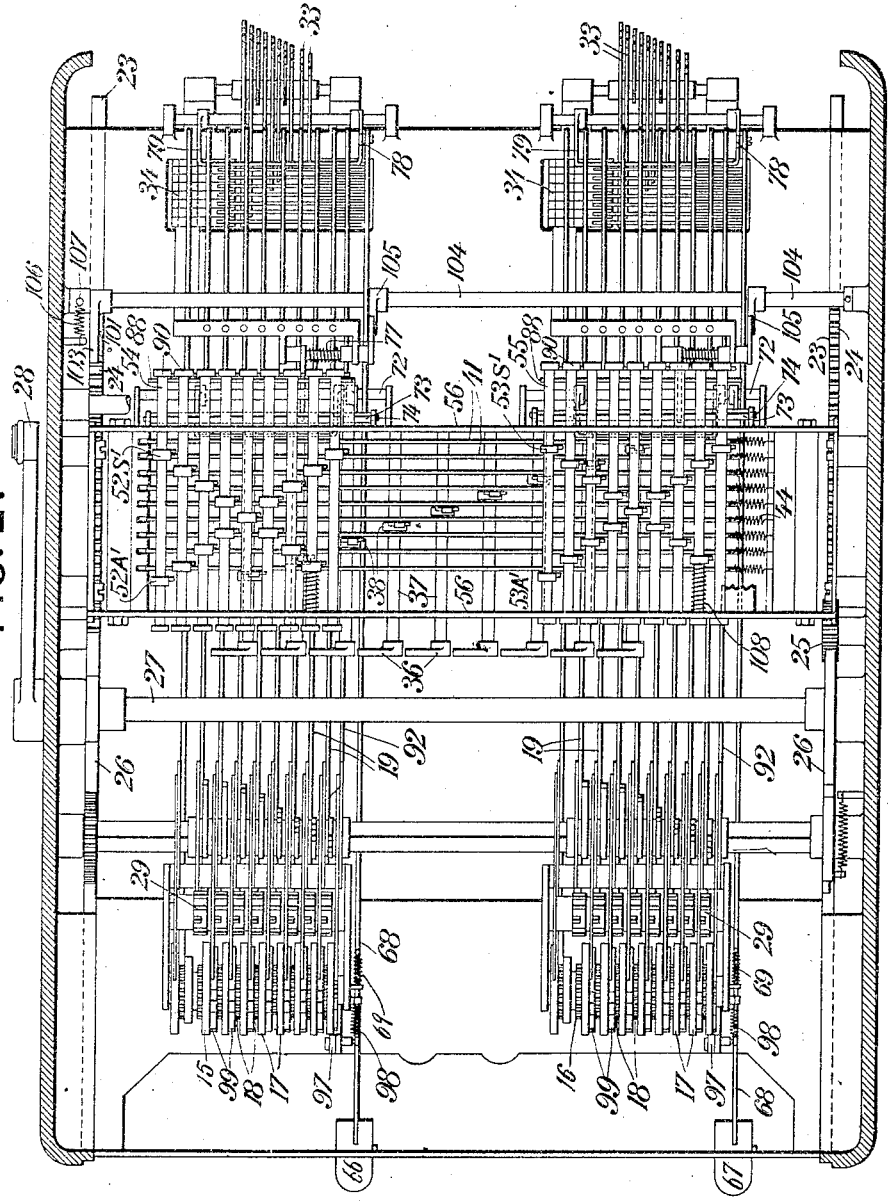
Fig. 2 is a horizontal section through the machine as a whole showing the pin-setting mechanism for the left-hand computing head viewed from the front in a subtracting condition and that of the right-hand computing head in an adding condition.
Figure 5:
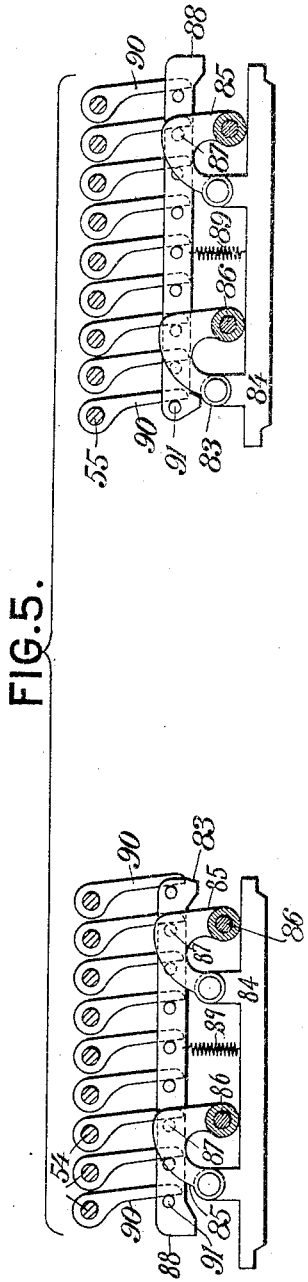
Fig. 5 is a vertical section on the line 5—5 of Fig. 3, showing the "0" pin restoring linkages.
Figure 6:
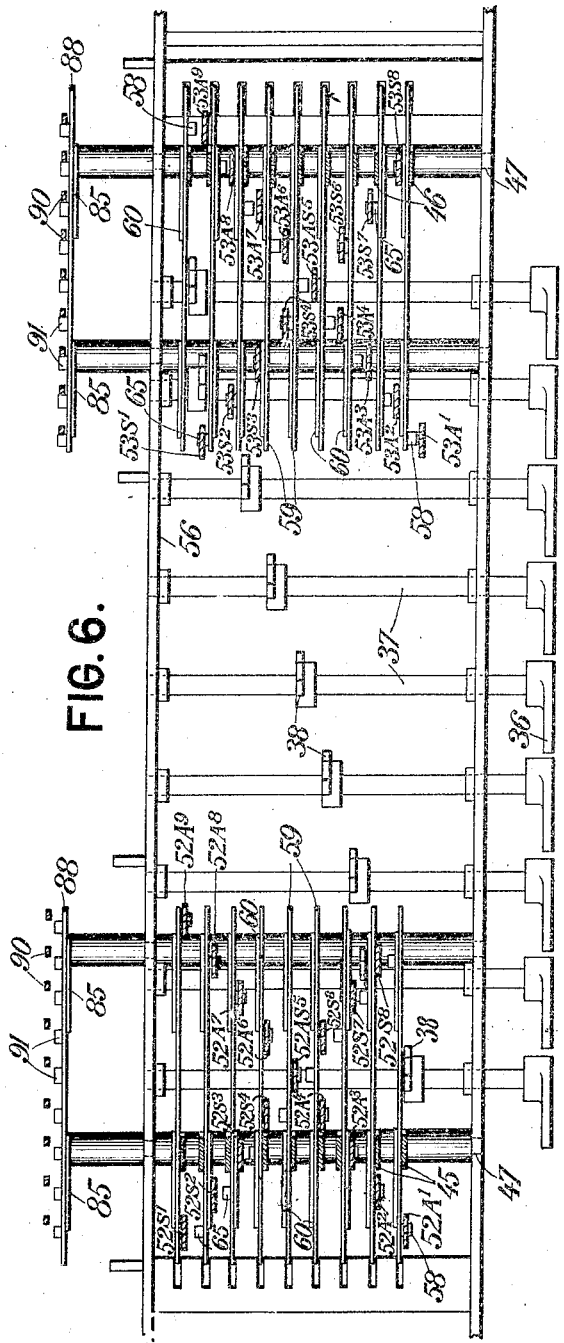
Fig. 6 is a horizontal section through the pin-setting linkages on the line 6—6 of Fig. 4, and showing the left-hand linkage in an adding state and the right-hand linkage in a subtracting state.

Fig. 13 is a fragmentary view in elevation of the pin-setting mechanism showing the thrust rod of the numeral key "1" in the act of being depressed to actuate the linkage and showing the left-hand secondary linkage in a condition for addition and the right-hand secondary linkage in a condition for subtraction. In this view it will be evident that the left-hand secondary linkage is setting up a "1" pin corresponding to the "1" numeral key and the right-hand secondary linkage is setting up "8" corresponding to the complement of one, using nine as the base.

Referring more particularly to the separate parts of this invention as embodied in the form shown in the drawings, 1 indicates numeral keys and 2 character keys, which depress key-levers 3 to rock bell cranks 4 and thus swing type-bars 5 up rearwardly against the front side of a platen 6 mounted to rotate on a carriage 7. At the actuation of any of the keys the carriage 7 is given a step-by-step movement by a spring barrel, not shown, under the control of an escapement mechanism indicated in general at 8. This escapement mechanism includes a rack bar 9 adjustably mounted on the carriage 7 so as to be movable into and out of engagement with a pinion 10 connected to an escapement wheel 11, which is controlled in its movement by a pair of dogs 12 mounted on a universal frame 13, the latter being reciprocated at the actuation of any of the keys by engagement therewith of heels 14 provided on the type-bars 5.

The numeral keys 1 in addition to operating the type action to print the numbers on the work-sheet carried by the carriage 7, also are arranged to control the numbers to be run up in a plurality of computing heads, of which two are shown in this illustration at 15 and 16. These computing heads each include a series of computing wheels 17 carrying gears 18, which are connected thereto by a pawl-and-ratchet mechanism, not shown, so as to be driven by rack-bars 19 having racks 20 meshing with the gears 18. The rack-bars 19 are each provided with a series of pins 21, nine in number, corresponding to the numeral keys and digits from "1" to "9." These pins 21 are settable from a position projecting above the rack-bars to a position projecting below the rack-bars, so as to determine the extent of movement thereof.

The movement to the rack-bars 19 may be given by a cross bar 22 on a general operator 23 coming into engagement with the set pins 21 on its forward movement, advancing the rack-bars 19 and thus advancing the computing wheels 17 amounts corresponding to the pins set. The motion of the general operator may be obtained in any suitable manner, as by means of one or more racks 24 provided on the side bars of the general operator and meshing with pinions 25 engaged by segments 26 on a shaft 27 which is also provided with a handle 28 which may be oscillated when it is desired to reciprocate the general operator 23.

During the return stroke of the general operator the tens-carrying is effected for the computing wheels 17 in the usual manner by a tens-carrying mechanism indicated in general at 29, which may be driven from one of the racks 24.

In order that the pins 21 on the rack-bars 19, which are denominational members in that they correspond with the denominations of the computing wheels, may be set, it is necessary to move each of the rack-bars individually from its fellows, so that the pins set will be on a denominational rack-bar 19 corresponding to the denominational column being written in on the work-sheet carried by the carriage. To accomplish this, there is provided on the carriage 7, for each of the computing heads 15 and 16, a tappet 30 which is arranged to come into coöperation seriatim with a set of jacks 31 for each of the computing heads. These jacks are pivotally mounted intermediate their ends so as to be rocked by their particular tappet 30 and thus depress thrust rods 32, which in turn rock bell cranks 33 of transposition linkages 34 arranged to raise individually the pin-bearing rack-bars 19. The transposition linkages 34 are so constructed that while the tappet 30 for each computing head advances into coöperation with the jacks 31 from right to left with the travel of the carriage 7, the lifting of the rack-bars 19 will advance from left to right corresponding with the computing in the computing heads 15 and 16.

From the above it will readily be seen that for the two computing heads 15 and 16 there will be provided two tappets 30 and two sets of jacks 31. The tappets 30 may act at the same time so that two pin-bearing rack-bars may be concomitantly lifted so as to have pins thereon set up concomitantly either according to the direct values of the numeral keys 1 or to the complements thereof, according to whether the computing heads 15 and 16 are to add or to subtract.

In order to set the pins 21 coöperation of the numeral keys 1 is needed with the raising of the pin-bearing rack-bars 19. To do this, each of the numeral keys 1 is provided with a thrust link 35 which engages an arm 36 provided on a rock shaft 37, of which there is one for each of the numeral keys from "1" to "9". These rock shafts, in addition to the arms 36, are provided with arms 38 forked at their upper extremities to engage pins 39 provided on links 40, of which there is one for each numeral key from "1" to "9".

This mechanism may be termed the primary or master linkages 41, in that it is controlled from one set of numeral keys and in turn controls two sets of secondary pin-setting linkages, one for each of the computing heads 15 and 16. Inasmuch as two computing heads are shown, these sets of secondary pin-setting linkages will be indicated specifically by the numeral 42 for that corresponding to the computing head 15, and 43 for that corresponding to the computing head 16. Each set of the secondary pin-setting linkages 42 and 43 is of the alternative type, so that it may be actuated by the primary or master pin-setting linkages 41 either to set pins in direct accordance with the values of the numeral keys actuated or according to the complements of these values.

Each of the links 40 is supported for reciprocatory motion against the tension of a spring 44 in one direction by arms 45 and 46 loosely mounted on fixed shafts 47. Each of these links is provided with a plurality of long pins 48 and 49, one for each computing head 15 and 16. These pins engage (Figs. 3 and 4) in slots 50 and 51 provided in arms 52 and 53. There are nine of the arms 52 corresponding to the digits "1" to "9" for the computing head 15 and there are likewise nine of the arms 53 corresponding to the same digits for the computing head 16. The pins 48 and 49 are arranged in echelon, so that the arms 52 and 53 may avoid other arms of the same series.

The arms 52 are secured to a series of rock shafts 54 while the arms 53 are similarly secured to a series of rock shafts 55. These rock shafts are mounted in a frame 56 for sliding movement, so as to adjust the arms 52 and 53. The control, however, for the rock shafts 54 is separate from that for the rock shafts 55, as will be explained hereinafter, so that the pin-setting mechanism of one computing head can be controlled as to its adding or subtracting state independently of the control of the other computing head.

The arms 52 for the computing head 15 will be indicated specifically as $52A^1$, $52A^2$, $52A^3$, $54A^4$, $52AS^5$, $52A^6$, $52A^7$, $52A^8$ and $52A^9$, designating that they are the adding arms for the digits "1" to "9" of the computing head 15. Similarly, the arms 53 for the computing head 16 will be indicated specifically at $53A^1$, $53A^2$, $53A^3$, $53A^4$, $53AS^5$, $53A^6$, $53A^7$, $53A^8$ and $53A^9$.

In addition to the adding arms, each secondary pin-setting set of linkages comprises a series of subtracting arms which extend on an opposite diagonal from that of the adding arms (Fig. 3). These arms are indicated, in the case of the secondary pin-setting linkages 42, by the numerals $52S^1$, $52S^2$, $52S^3$, $52S^4$, $52AS^5$, $52S^6$, $52S^7$ and $52S^8$. For the secondary pin-setting linkages 43, there is likewise provided a set of subtracting arms on the shafts 55, indicated specifically by the numerals $53S^1$, $53S^2$, $53S^3$, $53S^4$, $53AS^5$, $53S^6$, $53S^7$ and $53S^8$. In each instance there is no subtracting arm for the "9" key, as in this system the complement of nine is zero. The arm corresponding to the "5" digit and the complement thereof is common for both the adding and the subtracting set of arms, as it lies between the fifth and fourth linkages corresponding to the exact value of the digit key "5" and the complementary value of the digit key "5". While the arms 52A and 53A are connected to be actuated by the links 40, the arms 52S and 53S depend for their motion on being secured to the rock shafts 54 and 55 and are not directly connected to the links 40.

Inasmuch as from this point on the two secondary pin-setting mechanisms are identical but one will be described. Each of the arms 52A or 53A is provided with a fork 57, which engages a pin 58 on a link 59. There are one of these pins 58 and one of the links 59 for each of the digits from "1" to "9". When the arms 52A, 53A are in engagement with these pins, they reciprocate the links 59, which in turn rock bell crank levers 60 pivoted at 61 to the fixed shafts 47, at 62 to the links 59, and at 63 to a sub-link 64. There is a pair of the bell cranks 60 for each of the links 59, so that the motion of the sub-link 64 will always be parallel to that of the link 59 and in a downward direction.

Each of the links 59 corresponds to a row of the pins 21 in the nest of the corresponding computing head. That is to say, if the sub-link 64 corresponding to the digit "1" is actuated, then it will set up the particular pin corresponding to the digit "1" on the particular rack bar 19 which happens to be raised above its fellows; that, too, for both computing heads if both are in action.

As has been stated above, the rock shafts 54 and 55 are slidable bodily in the frame 56 when changing from an adding position such as shown at the left in Fig. 3, to a subtracting position such as shown at the right in Fig. 3. In moving from an adding to a subtracting position, the adding arms 52A, 53A for whichever computing head is being changed from addition to subtraction, are shifted so that the forks 57 on all of the adding arms come out of engagement with the pins 58, but the pins 48, 49 are long enough to stay in engagement with the perforations 50, 51 in the adding arms, so that these adding arms are at no time disconnected from the links 40.

At the same time that the adding arms are shifted to a disengaged position with respect to the links 59, the subtraction arms 52S and 53S will be shifted so that corresponding forks will come into engagement with pins 65 on the opposite sides of the links 59. The subtracting arms, however, will come into engagement with such of the links 59 as will set the complements of the values of the keys struck instead of the direct values. That is to say, in case of the computing head 15, the subtracting arms 52S$^1$, 52S$^2$, 52S$^3$, 52S$^4$, 52AS$^5$, 52S$^6$, 52S$^7$ and 52S$^8$ will become connected up to the links 59 and thus to the links 64 corresponding to a setting of the pins having values "8," "7," "6," "5," "4," "3," "2" and "1" respectively. It will thus be seen that when either one of the secondary pin-setting linkages 42, 43 is adjusted for subtraction, it will be in a condition to set up pins according to the complements of the numeral keys struck and not according to the direct values of the numeral keys struck.

In order to shift the shafts 54 and 55 and perform such other functions as are necessary to a subtracting operation, there is provided for the computing head 15, a subtraction-setting key 66, and for the computing head 16, a subtraction-setting key 67, the action of each key being the same, so that only one will be described. When one of the subtraction keys is thrust rearwardly, it carries with it a subtraction rod 68 against the tension of a spring 69. On the subtraction rod there is provided a pin 70 (Figs. 1 and 9), which engages a lever 71 pivoted at 72 to rock the same so as to force the upper extremity of the lever 71 in the direction of the uppermost arrow shown in Fig. 9. The upper extremity of this lever bears against a shifter bar 73 beyond the pivot 74 thereof so as to rock the same. The shifter bar 73 engages in a series of alined slots 75 provided in the rock shafts 54, 55, according to which computing head is considered. The shifter bar 73 thus acts to shift the rock shafts 54, 55 of its particular computing head from its adding position shown in Fig. 1, to its subtracting position shown in Fig. 9, wherein the adding arms will be disconnected from the pin-setting linkages 59 and the subtracting arms will be connected thereto. When the shifter bar 73 has completed this action, it is caught in its subtracting position by a latch 76, which is normally spring pressed to action by a spring 77.

In addition to shifting the rock shafts for subtraction, each subtraction rod 68 rocks an arm 78 to which is secured a bail 79 universal to all of the denominational rack bars 19 for one computing head solely. This universal bail raises all of these rack bars so that the "9" pins thereon may be set. To accomplish this, the shaft or pivot 72 of the lever 71 has also secured thereon a bail 80 which overlies and rocks a series of levers 81 pivoted intermediate their ends and engaging at their front ends in grooves 82 provided in the "9" pins of the pins 21 on all of the bars 19 of the computing head being set for subtraction.

The tails of the "9" pin leavers 81 for each of the computing heads 15 and 16 underlie separate pin-restoring linkages 83, one for each set of "9" pin levers 81. These pin-restoring linkages are the same, so only one will be described. Each pin-restoring linkage 83 comprises a lower reach 84, which is arranged to engage with the tails of the "9" pin levers 81 when the rack-bars 19 thereof are raised to set up a pin in a subtraction-setting operation corresponding to any of the numeral keys from "1" to "9". The reach or link 84 is pivotally connected to a pair of arcuate bell cranks 85, which are pivoted at 86 to the fixed rods or supports 47, and which are also pivoted at 87 to an upper reach 88 of the pin-restoring linkage 83. The reaches 84 and 88 are thus always maintained parallel to each other and are normally held in a collapsed position by a spring 89, which holds the lower reach or link 84 in its uppermost position.

When any of the numeral keys are struck, however, for a particular computing head in a subtracting operation, as has been stated above, one of the shafts 54, 55, according to the computing head, is rocked. This rocking may be translated into a spreading motion of the pin-restoring linkage 83 and a downward motion of the reach or link 84 to engage the tails of the levers 81 on the particular rack-bar 19 which happens to be raised at this time. To do this, each of the shafts 54, 55 is provided with an arm 90, which, when the shaft associated therewith is rocked, will engage a corresponding pin 91 on the upper reach 88, so as to swing this reach to one side, thereby, through the connected bell cranks 85, depressing the lower reach or link 84. That is to say, there is one of the arms 90 for each digit numeral key from "1" to "9", and there is one of the pins 91 for each of these arms, so that no matter what numeral key is struck, the pin-restoring linkage 83 will be actuated and the link or reach 84 depressed to restore the "9" pin on the particular denominational column rack-bar 19 in action.

In a normal adding operation of course there is no necessity for having the arms 90 in action, so that these arms are normally clear of the pins 91 when the pin-setting mechanism for any particular computing head is set for addition. When, however, the pin-setting mechanism is adjusted for subtraction, inasmuch as the rock shaft 54, 55 are slid forwardly, the arms 90 will be brought into engagement with the pins 91 at such time.

It is essential in this type of machine to give an added step of movement in a subtracting operation to the computing wheel of lowest denomination, that is, in the decimal system, the units or cents wheel. For this purpose there is provided for each computing head a supernumerary bar 92 (Fig. 7), which has but a single pin 93 settable to determine a movement of the bar 92 by the general operator 23 when the latter is moved forwardly to run up a subtraction accumulation. The supernumerary bar overlies the universal bail 79, so that when all of the pin-bearing rack-bars are raised, it will likewise be raised so that the pin 93 thereon will engage a fixed abutment 94 (Fig. 9). The pin 93 will then be set to a position projecting below the supernumerary bar 92. The bar 92 when advanced forwardly by the general operator will engage a rock arm 95, pivoted at 96 and bearing a kicking pawl 97 which is normally held by a spring 98 in engagement with the teeth of a gear 99 on the units or cents computing wheel. The movement of the bar 92 will rock the arm 95 against the tension of a spring 100, so as to pull down the pawl 97 a distance equal to one step of movement of the units computing wheel. It will therefore happen that when the general operator returns and withdraws the supernumerary bar 92, the spring 100 will expand, forcing the kicking pawl upwardly, so that the units or cents computing wheel will be kicked around one step in excess of the movement determined by the units or cents rack-bar 19.

As has been stated above, when a computing head was set for subtraction, the pin-setting mechanism, including the rock shafts 54 or 55 and the shifter bar 73, was locked in its subtraction-setting position by the latch 76.

Now, then, it is desirable to release this lock and permit the return of the pin-setting mechanism to an addition-setting state after the accumulation of a subtraction computation, that is, after the number to be computed has been run up in the computing wheels. For this purpose there is provided in one of the side bars of the general operator 23, a camming notch 101 (Fig. 1), in which engages a follower head 102 on an arm 103. This arm 103 is secured to a rock shaft 104, so as to rock the same, when the general operator 23 starts forwardly in the operation of running up in the computing wheels, a number accumulated by the setting of the pins 21. The rock shaft 104 has an arm 105 for each of the computing heads 15 and 16, and thus for each of the latches 76.

With the rocking of the shaft 104 on the forward movement of the general operator, these arms 105 will be swung upwardly to engage the tail ends of the latches 76 and swing the locking ends thereof downwardly against the tension of the springs 77, so as to release the shifter bars 73 and permit the return of the rock shafts 54, 55 and the parts carried thereby under the traction of the springs 108 to their normal addition-setting positions. After such an operation the rock shaft 104 and parts carried thereby may be returned to their normal positions by one or more springs 106, which are connected to pins on arms 107 on the rock shaft 104.

In the operation of the device, tappets 30 are located on the carriage 7 at such points where it is desired to have computing zones or columns for the two or more computing heads 15, 16. While only two computing heads are shown, it is to be understood that any number within reasonable limit may be used. The carriage 7 is started at the extreme right of its travel and brought to the first computing zone in any suitable manner, as by means of tabulating mechanism not shown. The tappets 30 for the different computing heads will then be ready to engage their own set of jacks 31 to accord the denominational columns of the computation as carried on by the computing mechanism with the denominational columns of the matter as written by the typewriting mechanism. The numeral keys 1 are then struck to write the digits on the work-sheet carried by the carriage, at the same time setting up these digits by a setting of the pins 21 whose rack-bars 19 are raised individually and *seriatim* by the jacks 31. That is to say, if we have two rack-bars raised, one for each computing head, hence, by virtue of a master link 41 and the two secondary linkages 42 and 43, two pins will be concomitantly set, one for each computing head. If we are adding, these pins will be set according to the direct values of the numeral keys struck. On the other hand, if both of the computing heads were subtracting, these pins would be set according to the complements of the values of the numeral keys actuated instead of their direct values.

Again, it is possible to set one computing head for subtraction while the other is adding, so that there will be a concomitant setting of the pins, one according to the direct value of the numeral key actuated and the other according to the complement of the value of the numeral key actuated. This feature is made possible by having the individual secondary setting linkages 42, 43, which are individually adjustable for either addition or subtraction. That is to say, the rock shafts 54 can be adjusted by the actuation of the subtraction key 66 independently of the rock shafts 55 which are adjusted by the subtraction-setting key 67. Each subtraction key 66 or 67 also controls individually the other functions necessary for a subtracting operation, such as the setting of the "9" pins and the setting of the excess-movement pin 93 on the supernumerary bar 92. If either or both of the computing heads is set for subtraction, after this subtraction computation has been run up the mechanism will be automatically returned to its adding condition by the tripping of the latches 76 on the forward movement of the general operator 23 to run up the subtraction computation.

We have then two or more computing heads having independent secondary pin-setting mechanisms, all of which, however, are subservient to a master setting mechanism so that the actuation of any numeral key may cause the setting of a corresponding or complementary pin in all of the nests of pins for all of the computing heads. Further, it will be seen that inasmuch as each setting mechanism is independently controllable for subtraction, one may concomitantly subtract while the others add, in case there are more than two computing heads, without interfering with the actions of one another.

Variations may be resorted to within the scope of the invention, and portions of the improvements may be used without others.

Having thus described my invention, I claim:

1. The combination with a plurality of computing heads, each comprising a plurality of computing wheels, of a nest of pins for each computing head for determining the extent of rotation of the wheels thereof, a secondary setting mechanism individual to each nest of pins, and a master setting mechanism for actuating all of said secondary mechanisms.

2. The combination with a plurality of computing heads, each including a plurality of computing wheels, of a nest of pins for each computing head for determining the extent of rotation of the wheels thereof, a secondary set of linkages individual to each nest of pins for setting said pins, and a set of master linkages common to all of said secondary linkages and capable of actuating the same concomitantly.

3. The combination with a plurality of computing heads, each including a plurality of computing wheels, of a nest of pins for each computing head for determining the extent of rotation of the wheels thereof, a secondary set of linkages individual to each nest of pins for setting said pins, a set of master linkages common to all of said secondary linkages and capable of actuating the same concomitantly, and shifting means for varying the setting action as determined by the secondary linkages so as to vary the type of computation effected.

4. The combination with a plurality of computing heads, each including a plurality of computing wheels, of a nest of pins for each computing head for determining the extent of rotation of the wheels thereof, a secondary set of linkages individual to each nest of pins for setting said pins, a set of master linkages common to all of said secondary linkages and capable of actuating the same concomitantly, and shifting means individual to each set of secondary linkages for varying the type of computation effected thereby.

5. The combination with a plurality of computing heads, of independent means for indexing computations concomitantly for each head, means for transferring indexed computations concomitantly to all said computing heads, a single set of numeral keys and means controlled thereby for controlling all said independent indexing means, and means individual to each of said independent indexing means for varying the character of computation as to addition and subtraction.

6. The combination with a plurality of computing heads, of actuating mechanism therefor including computation indexing mechanism for said heads having parts individual to each head and parts in common, and means individual to each head for changing the character of computation indexed irrespective of the character of computation indexed by the other heads.

7. The combination with a plurality of computing heads each having a plurality of computing wheels, of a nest of pins individual to each computing head and settable to determine the extent of rotation of the computing wheels thereof, a plurality of secondary setting linkages, one individual to each of said nests of pins, actuating linkages common to all of said secondary linkages and arranged to operate the same concomitantly, and a single set of numeral keys for actuating said actuating linkages.

8. The combination with a plurality of computing heads each having a series of computing wheels, of a plurality of nests of pins, one for each of said computing heads settable to determine the extent of rotation of the wheels thereof, secondary linkages individual to each nest of pins for setting the same, master linkages common to all of said secondary linkages and arranged to actuate the same concomitantly, and means for varying the connection between the secondary linkages and the master linkages to vary the setting action of said secondary linkages for the same action of said master linkages.

9. The combination with a plurality of computing heads, each having a plurality of computing wheels, of a nest of pins individual to each of said computing heads, said pins being settable to determine the extent of rotation of the computing wheels of said computing heads, a secondary setting mechanism individual to each of said nests of pins, a master setting mechanism common to all of said secondary setting mechanisms and arranged to actuate the same, and means for varying the connection between said secondary setting mechanisms and said master setting mechanism to vary the character of setting action thereof.

10. The combination with a plurality of computing heads, each including a series of computing wheels, of a nest of pins individual to each of said computing heads and settable to determine the extent of rotation of the computing wheels thereof, secondary setting linkages for each of said nests of pins, master linkages common to all of said secondary linkages and arranged to actuate the same, and means for varying the individual connection between said master linkages and each of said secondary linkages so as to vary the individual type of setting action of each secondary set of setting linkages irrespective of the action of the other secondary setting linkages.

11. The combination with a plurality of computing heads, of a plurality of nests of pins one individual to each of said computing heads, said pins being settable to determine the extent of computation run up in said computing heads, a set of secondary setting linkages individual to each nest of pins, a set of master setting linkages common to all of said sets of secondary setting linkages, a series of nine arms for each set of secondary setting linkages corresponding to the digits 1 to 9, connected to said set of master setting linkages, one arm in each series individual to each master setting linkage, said series of arms being also connected to each of said sets of secondary setting linkages, one arm for each secondary setting linkage in each set whereby said master linkages may actuate said secondary linkages one in each set concomitantly, and numeral keys for controlling the action of said set of master setting linkages.

12. The combination with a plurality of computing heads, of a nest of pins individual to each of said computing heads settable to determine the extent of computation carried on by said computing heads, a set of secondary setting linkages individual to each of said nests of pins, a set of master setting linkages common to all of said sets of secondary setting linkages, a series of numeral keys for actuating said set of master setting linkages, a plurality of sets of adding arms, one set individual to each set of secondary setting linkages, and one arm in each set individual to each master linkage and connected thereto to be actuated thereby and also individual to one secondary setting linkage in the accordant set of secondary setting linkages, a plurality of sets of subtracting arms, one set individual to each set of secondary setting linkages, and one arm of each set individual to one of said master linkages and also individual to one secondary setting linkage in the accordant set of secondary setting linkages, and means for shifting said sets of arms so as to interrupt the connection of an adding set between said set of master setting linkages and one of said sets of secondary setting linkages, at the same time completing the connection by means of said subtracting arms between said set of master setting linkages and a set of said secondary setting linkages.

13. The combination with a plurality of computing heads, each including a series of computing wheels, of a nest of pins individual to each computing head, said pins being settable to determine the extent of rotation of said computing wheels, a set of secondary setting linkages individual to each nest of pins, a set of master setting linkages common to all of said sets of secondary setting linkages, numeral keys for actuating said set of master setting linkages, there being one numeral key for each master linkage, a plurality of sets of adding arms, one set individual to each set of secondary setting linkages, and one arm in each set individual to each master linkage and also individual to one secondary setting linkage in the accordant set of said secondary setting linkages, and a plurality of sets of subtracting arms, one set being individual to each set of secondary setting linkages, and one subtracting arm of each set individual to each master linkage, with the exception of the linkage of highest value, and also individual to each secondary setting linkage for the accordant set of secondary setting linkages with the exception of the linkage of highest value, said subtracting arms and said adding arms being alternative in their action to form a connection between said master linkages and said secondary setting linkages so as to set said pins either according to addition or according to subtraction.

14. The combination with a plurality of computing heads, each including a series of computing wheels, of a nest of pins individual to each computing head, said pins being settable to determine the extent of rotation of said computing wheels, a set of secondary setting linkages individual to each nest of pins, a set of master setting linkages common to all of said sets of secondary setting linkages, numeral keys for actuating said set of master setting linkages, there being one numeral key for each master linkage, a plurality of sets of adding arms, one set individual to each set of secondary setting linkages, and one arm in each set individual to each master linkage and also individual to one secondary setting linkage in the accordant set of said secondary setting linkages, and a plurality of sets of subtracting arms, one set being individual to each set of secondary setting linkages, and one subtracting arm of each set individual to each master linkage, with the exception of the linkage of highest value, and also individual to each secondary setting linkage for the accordant set of secondary setting linkages with the exception of the linkage of highest value, the adding arms and the subtracting arms for each set of said secondary setting linkages being individually alternative in their action so as to permit the concomitant setting of one nest of pins corresponding to one computing head for addition while another nest of pins corresponding to another computing head may be set for subtraction.

15. In a computing machine, the combination with a plurality of systems of settable devices on which a number may be set up, of a plurality of sets of registering devices into which said numbers so set up may be carried, a plurality of sets of secondary setting linkages, one set individual to each system of settable devices, a set of master setting linkages common to all of said sets of secondary setting linkages, individual connections for adding between said set of master setting linkages and each of the linkages of each set of secondary setting linkages, individual connections for subtracting between said set of master setting linkages and each set of secondary setting linkages, and shifting means for said adding and subtracting connections for each secondary set, whereby said systems of settable devices may be set for either addition or subtraction.

16. The combination with a plurality of computing heads, each including a plurality of computing wheels, of a system of settable devices for each of said computing heads for determining the extent of rotation of the computing wheels thereof, a set of secondary setting linkages individual to each of said systems of settable devices, and a set of master setting linkages common to all of said sets of secondary setting linkages, a series of rock shafts for each set of secondary setting linkages, a set of adding arms on said rock shafts, a set of subtracting arms on said rock shafts, and means for shifting said rock shafts to bring said adding arms and said subtracting arms alternately into play as a means of connection between said sets of secondary setting linkages and said set of master setting linkages.

17. The combination with a plurality of computing heads, of a plurality of systems of settable devices, one system individual to each of said computing heads for determining the extent of computation thereof, a set of secondary setting linkages individual to each of said systems of settable devices, a set of master setting linkages common to all of said sets of secondary setting linkages, a series of adding arms for each of said sets of secondary setting linkages, a series of subtracting arms for each of said sets of secondary setting linkages, and shifting means individual to each computing head and each set of secondary setting linkages for alternating the individual connections between said set of master setting linkages and said sets of secondary setting linkages individually by means of said adding arms and by means of said subtracting arms.

18. The combination with a plurality of computing heads, of a system of settable devices individual to each of said computing heads to determine the extent of computation thereof, a set of secondary setting linkages individual to each of said systems of settable devices, a set of master setting linkages common to all of said sets of secondary setting linkages, a plurality of sets of adding arms one set for each of said sets of secondary setting linkages, a plurality of sets of subtracting arms one set for each of said sets of secondary setting linkages, a set of rock shafts for each of said sets of secondary setting linkages, one rock shaft being connected to both the adding and subtracting arms, means for connecting said rock shafts to said master setting linkages to be actuated thereby, and a shifter bar individual to each set of rock shafts for shifting the same to alternate the connection of said adding arms and said subtracting arms between said set of master setting linkages and the sets of secondary setting linkages.

19. The combination with a numeral key, of a thrust bar connected to said numeral key, a rock shaft rockable by said thrust bar, an arm on said rock shaft, a link shiftable by said arm, an adding arm connected to said link, a subtracting arm connected to be actuated by said link, a linkage, a plurality of pins settable by said linkage, and shifting means for alternating the operative connection between said link and said linkage through the intermediary of said adding and said subtracting arms alternately.

20. The combination with a plurality of computing heads, of a subtraction-setting mechanism individual to each of said heads, a system of settable devices individual to each head to determine the extent of computation thereof, a secondary setting mechanism individual to each system of settable devices, and a master mechanism common to all said secondary setting mechanisms for actuating the same.

21. The combination with a numeral key, of a rock shaft rockable by said numeral key, an arm on said rock shaft, a master link reciprocal by said arm, a plurality of sets of secondary linkages, a plurality of sets of pins actuable by said linkages, an adding arm for each of said sets of secondary linkages connected to be actuated by said master link, a subtracting arm for each of said secondary linkages connectible to be actuated by said master link, and shifting means individual to each pair of adding and subtracting arms for alternating the connection between said master link and the associated secondary linkages individually.

22. The combination with a nest of pins, of a secondary setting mechanism for said pins including a set of linkages, each having a pin thereon, a master set of setting linkages for operating said secondary setting mechanism, each of said master linkages having a pin thereon, and a series of arms one for each of said master linkages and one for each secondary setting linkages, said arms engaging said pins to form a means of connection therebetween, the pins on one set of linkages being longer than the pins on the other set of linkages, whereby said arms may be adjusted to interrupt the connection thereof from one set of linkages while maintaining the connection with the other set of linkages.

23. The combination with a plurality of computing heads, of a plurality of sets of denomination-determining members, one set individual to each computing head, means for raising a plurality of said denomination-determining members concomitantly, one in each set and *seriatim* for the members of a set, settable devices on said members for determining the extent of movement thereof, a set of secondary setting linkages individual to each set of denomination-determining members, and a set of master setting linkages common to all of said sets of secondary setting linkages to actuate the same, so as to concomitantly set ones of said settable devices in different sets of denomination-determining members.

24. In a computing machine, in combination, a plurality of computing heads each including a plurality of computing wheels, operating mechanism therefor including a plurality of sets of drivers, one set for each head, the different drivers of each set being individual to different wheels of the corresponding computing head, a set of number keys, and mechanism controlled thereby for determining the extent of movement of said drivers when operated, said key-controlled movement-determining mechanism including means capable of being rendered effective at the operation of each key, for concomitantly determining movements for corresponding drivers of different sets, varying in extent in accordance with elements of computations of different character.

25. The combination, with a plurality of computing heads; of a multiple drive individual to each of said computing heads, to run up numbers thereon; a general operator for simultaneously actuating all of said multiple drives, to enable all of said computing heads to have numbers run up on them in unison; a series of numeral keys; a setting mechanism capable of being actuated by said numeral keys and capable of indexing all said multiple drives, for concomitantly controlling the extent of movement thereof; and an independent state-controlling mechanism for each computing head directly associated with said setting mechanism, so as to control the action thereof upon the corresponding multiple drive, thereby to enable the character of computation of each computing head to be independent while computing with the same numbers in all computing heads as determined by the striking of the numeral keys.

26. The combination, with a plurality of computing heads; of a multiple drive individual to each of said computing heads, to run up numbers thereon; a general operator for simultaneously actuating all of said multiple drives, to enable all of said computing heads to have numbers run up on them in unison; a series of numeral keys; a setting mechanism capable of being actuated by said numeral keys and capable of indexing all said multiple drives, for concomitantly controlling the extent of movement thereof; an independent state-controlling mechanism for each computing head directly associated with said setting mechanism, so as to control the action thereof upon the corresponding multiple drive, thereby to enable the character of computation of each computing head to be independent while computing with the same numbers in all computing heads as determined by the striking of the numeral keys; and governing means actuated from said general operator during the running up of a computation, for varying the action of any or all of said state-controlling mechanisms.

27. The combination with a plurality of computing heads, of operating mechanism therefor including means for affording a preliminary representation of a computation for each of said computing heads, a single set of numeral keys for all said computing heads, and a setting mechanism capable of being actuated by said numeral keys to selectively control in different ways each of said preliminary representation means, so that different settings of the different preliminary representation means may be effected at the same time by the same keys.

28. The combination with a plurality of computing heads, of a series of denominational members for each of said heads, a series of digital elements for each denominational member determining the extent of movement thereof, a secondary setting mechanism for said digital elements, there being one of said secondary setting mechanisms for each of said computing heads, a master setting mechanism for actuating all of said secondary setting mechanisms, and numeral keys for controlling the action of said master setting mechanism.

29. The combination with a plurality of computing heads, of a series of denominational members for each of said heads, a series of digital elements for each denominational member determining the extent of movement thereof, a secondary setting mechanism for said digital elements, there being one of said secondary setting mechanisms for each of said computing heads, a master setting mechanism for actuating all of said secondary setting mechanisms, numeral keys for controlling the action of said master setting mechanisms, and an independent state-controlling means for each computing head directly associated with the corresponding secondary setting mechanism to control the action thereof upon the corresponding series of digital elements, so as to enable said secondary setting mechanisms on the actuation of said numeral keys to set said digital elements for the different computing heads all for addition or all for subtraction, or part for addition and part for subtraction, for the same digits as determined by the striking of single keys.

30. A computing machine comprising, in combination, a plurality of computing heads each including a plurality of computing wheels, and operating mechanism therefor for effecting computations of different character on different heads at a single computing operation by imparting to corresponding computing wheels thereof complementary movements of different extent but all in the same direction, said operating mechanism comprising a set of drivers for each head, movement-determining means in part individual to each set of drivers, and in part common to all, and state-setting means for selectively predetermining the effect of said movement-determining means for each head in accordance with the nature of the computation to be effected thereby.

31. The combination with a plurality of computing heads, each having a series of computing wheels, of a multiple drive for each of said heads, a general operator common to all of said drives, and means, including state-controlling mechanism, for effecting concomitant additive and subtractive drives of different computing heads at the same time, said means also including mechanism for varying the extent of the movements of the different drives in accordance with the setting of said state-controlling mechanism.

32. The combination with a plurality of distinct computing units, of a single set of numeral keys capable of controlling all said computing units, and an intermediate mechanism controlled by said numeral keys to simultaneously effect adding and subtracting computations in different computing units, said intermediate mechanism including driving means for each computing unit and mechanism for imparting to the driving means of different units movements varying in extent but bearing a complemental relation, thus determining which shall effect a computation in addition and which shall effect a computation in subtraction.

33. A computing machine comprising, in combination, a plurality of computing heads each including a plurality of computing wheels, and operating mechanism therefor including a set of variably settable movement-determining members individual to each computing head for determining the extent of rotation of the wheels thereof, a set of secondary setting devices individual to each set of movement-determining members, and a set of master setting devices available in common for setting secondary setting devices of each of said sets.

34. A computing machine comprising, in combination, a plurality of computing heads each including a plurality of computing wheels, and operating mechanism therefor including a set of variably settable movement-determining members individual to each computing head for determining the extent of rotation of the wheels thereof, a set of secondary setting devices individual to each set of movement-determining members, a set of master setting devices available in common for setting secondary setting devices of each of said sets, and state-setting mechanism for selectively varying the relation between said master setting devices and said secondary setting devices, so as to vary the character of computation to be effected.

35. A computing machine comprising, in combination, a plurality of computing heads each including a plurality of computing wheels, and operating mechanism therefor including a set of variably settable movement-determining members individual to each computing head for determining the extent of rotation of the wheels thereof, a set of secondary setting devices individual to each set of movement-determining members, a set of master setting devices available in common for setting secondary setting devices of each of said sets, and a state-setting device individual to each of said computing heads for selectively varying the relation between its secondary setting devices and said master setting devices, to predetermine the character of computation to be effected thereby.

36. A computing machine comprising, in combination, a plurality of computing heads each including a plurality of computing wheels, and operating mechanism therefor including a set of variably settable movement-determining members individual to each computing head for determining the extent of rotation of the wheels thereof, a set of secondary setting devices individual to each set of movement-determining members, and master setting means including a single set of numeral keys and devices controlled thereby for concomitantly and variably setting corresponding secondary setting devices of each of said sets, so as to effect computations of different character as determined by said settings.

37. The combination with a plurality of computing heads, of operating mechanism therefor including a set of variably settable movement-controlling members individual to each of said computing heads for determining the extent of computation carried on thereby, a set of secondary setting devices individual to each set of movement-controlling members, means including a set of number keys and master setting devices controlled thereby, available in common for setting corresponding secondary setting devices of each of said sets, a set of shiftable connectors for each set of secondary setting devices for variably effecting connections between setting devices of said set and said master setting devices, and state-setting mechanism individual to each computing head for shifting its connectors, so as to interchange the connections between the secondary setting devices of the set controlled thereby and said master setting devices in order to vary the character of computation to be effected.

38. The combination with a plurality of computing heads, each having a series of computing wheels, of a multiple drive for each of said heads, a general operator common to all of said heads for rotating said wheels through the intermediary of said drives, carrying mechanism to be initially set for a carry by said computing wheels when so rotated and operable by a subsequent movement of said general operator to complete said carry, and means, including state-controlling mechanism, for effecting concomitant additive and subtractive drives of different computing heads at the same time, the carrying mechanism for each head being capable of effecting a carry when either adding or subtracting.

39. In a computing machine, the combination with means for setting up a number both directly and complementally, of a plurality of registers, each register comprising dial wheels, and means, including mechanism for causing rotation of said dial wheels in one direction only, for automatically registering the value of said number in different registers simultaneously through a direct setting up of the numbers, or for registering the negative value of said number in different registers simultaneously through a complemental setting up of the numbers.

RICHARD M. BECKER.

Witnesses:
  F. E. ALEXANDER,
  GEO. W. NAYLOR.